Jan. 14, 1964     W. STELZER     3,117,421
VEHICLE BRAKE MASTER CYLINDER
Filed June 9, 1960     2 Sheets-Sheet 1
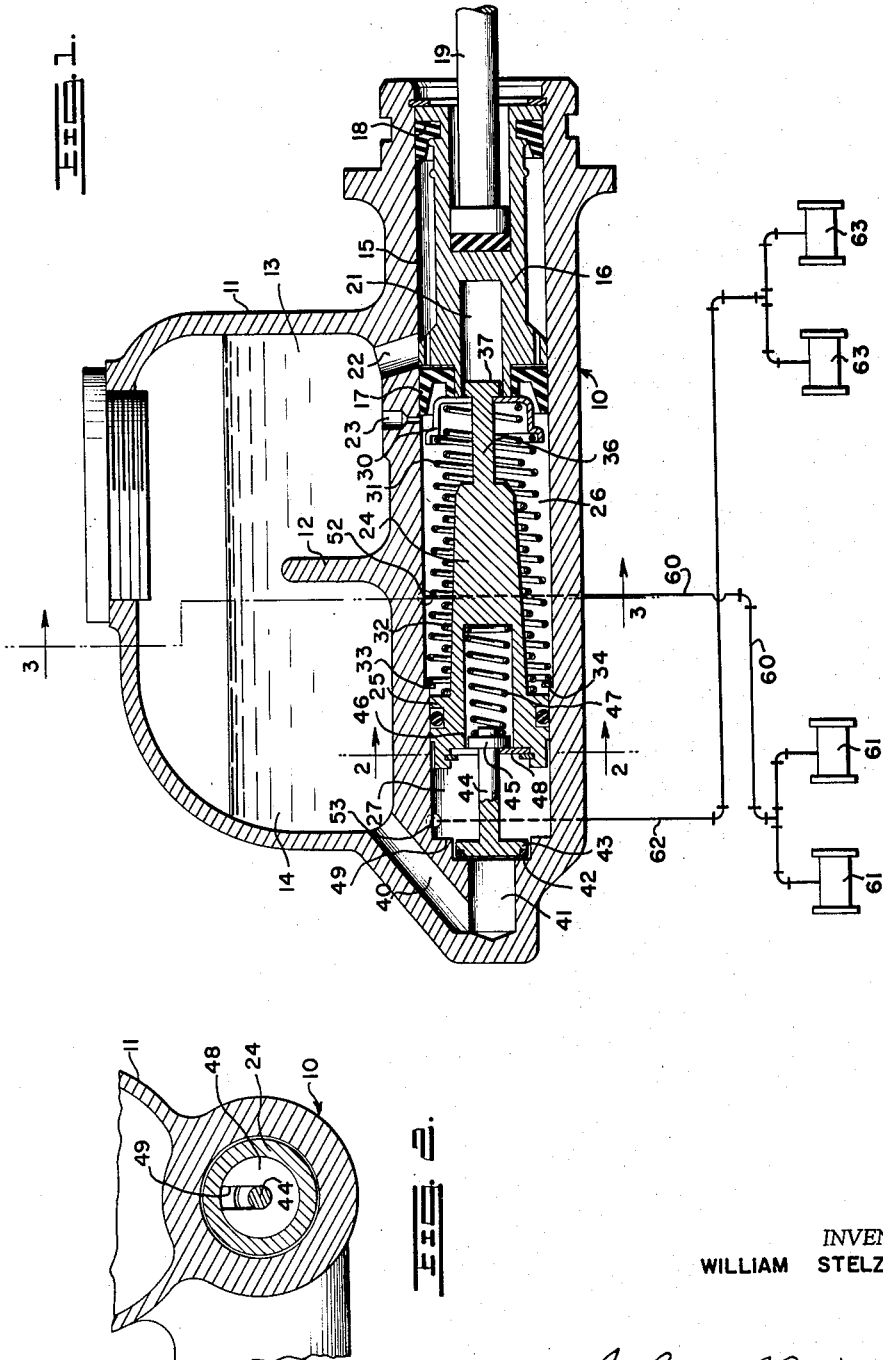
INVENTOR
WILLIAM STELZER
BY
ATTORNEY

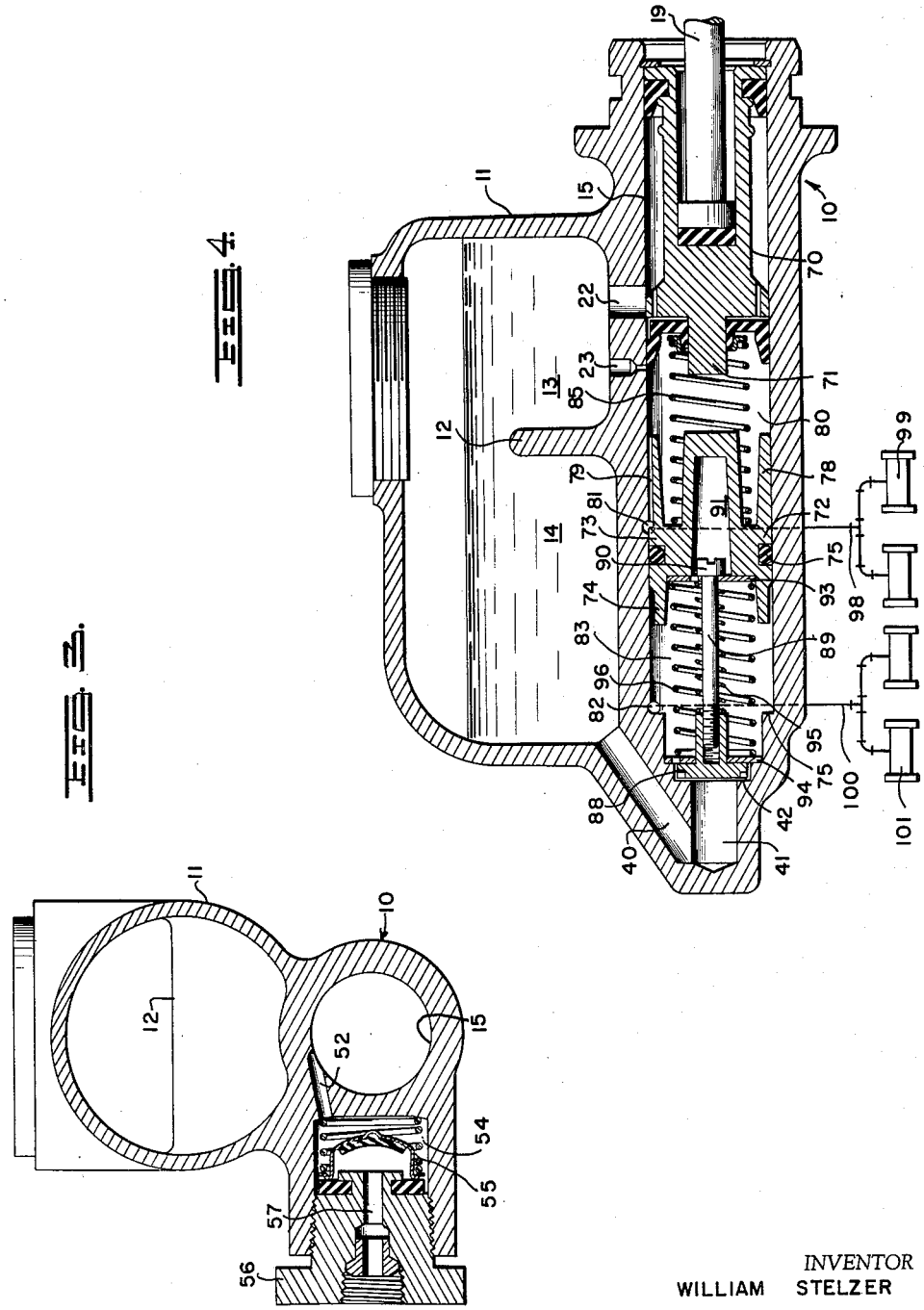

United States Patent Office
3,117,421
Patented Jan. 14, 1964

3,117,421
VEHICLE BRAKE MASTER CYLINDER
William Stelzer, Bloomfield Hills, Mich., assignor to Kelsey-Hayes Company, Detroit, Mich., a corporation of Delaware
Filed June 9, 1960, Ser. No. 34,962
8 Claims. (Cl. 60—54.6)

This invention relates to a vehicle brake master cylinder.

In conventional braking systems, a single master cylinder is provided with a pressure chamber in which pressure is generated by pedal pressure or by a booster motor to apply the brakes, and the pressure chamber has a single fluid outlet provided with conduits branching to supply hydraulic fluid under pressure to all of the wheel cylinders. Obviously, if any break occurs at any point in the conduit, all of the braking pressures are lost to all of the vehicle wheels.

An important object of the present invention is to provide a novel master cylinder for motor vehicles, wherein a single hydraulic cylinder is provided with a pair of novel types of fluid displacing plungers, one of which displaces fluid to the front wheel cylinders and the other to the rear wheel cylinders, and to so arrange the parts that upon the rupturing of one of the lines leading to one set of wheel cylinders, the other set of wheel cylinders may be operated by its associated master cylinder piston so that one set of brakes will be applied.

A further object is to provide a mechanism of the character referred to wherein the two master cylinder pistons cooperate to form a fluid pressure chamber therebetween connected to one set of wheel cylinders, with the master cylinder provided with a closed end cooperating with one piston to form a chamber communicating with the other set of wheel cylinders, and to provide means for utilizing fluid pressure between the two pistons for actuating one of such pistons when force is transmitted to the other piston by the brake pedal or other operating means.

A further object is to provide a mechanism of this character wherein, if desired, the two pistons are caused to cooperate with each other in such a manner that the rear wheel cylinders are operated prior to operation of the front wheel cylinders.

A further object is to provide a master cylinder having two pistons of the type described above and to provide means for limiting movement of the pedal operated piston relative to the second piston so that upon failure in the system connected to the chamber between the two pistons, the pedal operated piston will positively engage and move the second piston to displace fluid into the associated wheel cylinders, and to limit movement of such second piston relative to the pedal operated piston so that upon a failure of the system supplied with fluid from the second piston, the pedal operated piston will be operative for applying its associated brakes.

A further object is to provide in a mechanism of this character novel means for replenishing fluid from a reservoir to the chamber associated with the second piston referred to so that such chamber is always maintained full of brake fluid.

Other objects and advantages of the invention will become apparent during the course of the following description.

In the drawings I have shown two embodiments of the invention. In this showing:

FIGURE 1 is a sectional view taken axially through the master cylinder and associated elements with the wheel cylinders and their connections with the master cylinder diagrammatically illustrated;

FIGURE 2 is a detail section on line 2—2 of FIGURE 1;

FIGURE 3 is a section on line 3—3 of FIGURE 1; and

FIGURE 4 is a view similar to FIGURE 1, showing a modified form of mechanism.

Referring to FIGURE 1, the numeral 10 designates a master cylinder as a whole having preferably cast integral therewith an upper reservoir 11, the interior of which is provided with a transverse divider 12 to form chambers 13 and 14 for a purpose which will become apparent. The master cylinder 10 is provided with a bore 15 in which the two fluid displacing pistons to be described are arranged.

One of the pistons is indicated by the numeral 16 and may be conventional in construction, being provided at its ends with the usual primary and secondary cups 17 and 18 respectively. The outer end of the piston 16 is axially recessed for the reception of the end of a push rod 19 through which force is applied to the piston 16 either by direct pedal operation or through the medium of a booster motor. The piston is provided at its inner end with an axial recess 21 for a purpose to be described. The primary seal 17 and the adjacent portion of the piston 16 are conventional to provide for the flow therepast of hydraulic fluid supplied behind the head of the piston through a conventional port 22. A compensating port 23 communicates between the reservoir chamber 13 and bore 15 ahead of the seal 17.

A second piston 24 is slidable in the bore 15 and is provided at its end remote from the piston 16 with a head 25 which forms with the seal 17 and bore 15 a hydraulic chamber 26 communicating with certain of the wheel cylinders as described below. The head 25 forms with the adjacent end of the bore 15 a second hydraulic chamber 27 also communicating with one set of wheel cylinders to be described.

Against the inner end of the piston 16 is seated a retaining cup 30. This cup is used as a spring seat for two springs 31 and 32. One end of the spring 31 engages the outer peripheral portion of the cup 30 and has its other end engaging a snap ring 33 seated against a shoulder 34 in the bore 15. The spring 32 has one end engaging the cup 30 and its other end seated against the inner face of the head 25.

The body of the piston 24 may taper to decrease in diameter to the right as viewed in FIGURE 1 and is provided at its right-hand extremity with a shank 36 provided with a head 37 normally seated against the bottom of the cup 30 and movable under conditions to be described into the axial recess 21. The cup 30 is radially slotted, as will be apparent in FIGURE 1, to be moved radially into position around the stem 36.

The master cylinder casting is provided with a passage 40 communicating at one end with the chamber 14 and at its other end with an axial passage 41 opening into the chamber 27. A valve seat 42 is formed at the inner end of the passage 41 and is engageable by a normally slightly open valve 43 to close communication between the passage 41 and chamber 27. The valve 43 is carried by a stem 44 having a head 45 at its inner end movable into an axial recess 46 formed in the piston 24. The head 45 is engaged by a spring 47 to be biased into engagement with a stop plate 48 carried by the piston 24. This plate (FIGURE 2) is radially slotted as at 49 to be moved radially into position over the stem 44, the cup 30 being similarly radially slotted, as stated above. With the head 45 engaging the stop plate 48 and with the pistons 16 and 24 in the normal positions shown, the valve 43 will be held slightly open to replenish fluid in the chamber 27 from the chamber 14. Upon movement of the piston 24 to the left, the valve 43 will seat, whereupon the head 45 may move relatively into the recess 46. Movement of the piston 24 to the left in FIGURE 1 is limited beyond its normal travel by engagement of the head 25 with a shoulder 49 formed at the adjacent end of the bore 15.

The master cylinder is provided with outlet ports 52 and 53 communicating with the respective chambers 26 and 27. These outlet ports are adapted to supply fluid to lines leading to the associated master cylinders through conventional residual pressure valves which may be identical for both ports 52 and 53 and one of which is shown in FIGURE 3. The elements within the master cylinder in FIGURE 3 have been omitted, since the space within the bore 15 in FIGURE 3 may be either of the chambers 26 or 27. Assuming that the chamber 26 is shown, fluid may flow from the outlet port 52 into a chamber 54 in which is arranged a residual pressure valve 55 associated with a fitting 56 having an outlet port 57. The outlet port 57 associated with the port 52 is connected to one end of a line 60 which branches to supply fluid to the front wheel cylinders 61. The outlet 53 is connected by a line 62 which branches to supply hydraulic fluid to the rear wheel cylinders 63.

A modified form of the invention is shown in FIGURE 4 in which the master cylinder proper, the reservoir and fluid replenishing ports and passages may be identical with those described and which elements are indicated by the same reference numerals. In the modified form of the invention, the pedal or power operated piston is indicated by the numeral 70 and may be operated by the same push rod 19 as before. The piston 70 may be conventional except that it has its inner end provided with an axial extension 71 for a purpose to be described. The second piston 72 is shaped as shown in FIGURE 4, having a head 73 skirted at one end as at 74 for engagement with a shoulder 75 to positively limit movement of the piston 72 under conditions to be described. As is true of the head 25 of the piston 24, the head 73 is provided with an O-ring 75 which, in ordinary use, suffers little wear and produces little friction since the hydraulic pressures on opposite sides thereof are nearly balanced.

The piston 72 is provided with a second skirt 78 projecting toward the piston 70 and longitudinally grooved as at 79 to maintain communication between the chamber 80, formed between the pistons 70 and 72, and a fluid outlet port 81 corresponding generally to the port 52 described above. A similar port 82 communicates with a hydraulic chamber 83 formed between the piston head 73 and the left-hand end of the bore 15 of the master cylinder as viewed in FIGURE 4. The pistons 70 and 72 are urged apart by a spring 85 arranged in the chamber 80, such spring acting as a return spring for the piston 70.

The fluid replenishing passage 41 has its seat 42 engageable by a valve 88 similar to the valve 43 and having threaded connection with a stem 89 provided at its inner end with a head 90 movable into an axial slot 91 formed in the piston 72. Movement of the head 90 to the left in FIGURE 4 relative to the piston 72 is limited by a stop plate 93, while movement of the valve 88 from its seat is limited by a similar stop plate 94. Both of these plates are apertured as shown. A small spring 95, between the plate 93 and valve 88, urges the valve 88 away from the piston 72, but such movement is limited normally by the head 90, thus maintaining the valve 88 normally slightly open. Also, engagement of the valve 88 with the plate 94 and engagement of the head 90 with the plate 93 limits movement of the piston 72 to the left under the influence of a return spring 96 arranged between the plates 93 and 94.

The connection of the chambers 80 and 83 with the wheel cylinders is preferably reversed with respect to the showing in FIGURE 1. The port 81, through a residual pressure valve as described above, is connected by a line 98 with the rear wheel cylinders 99. The port 82 is similarly connected by line 100 to the front wheel cylinders 101.

*Operation*

The parts of the mechanism normally occupy the positions shown in FIGURE 1, the valve 43 being maintained slightly off its seat to connect the chamber 27 to the reservoir chamber 14, while the replenishing port 23 is open to the chamber 26. The master cylinder is operated by applying axial force to the push rod 19 either through the medium of a pedal or a booster motor, as stated above. Due to the initial loading of the spring 32, the pistons 16 and 24 initially move together as a unit whereby the compensating port 23 is closed while movement of the piston 24 allows the spring 47 to seat the valve 43. Pressure is then built up in the chamber 27 to force fluid through the outlet 53 through line 62 into the rear wheel cylinders 63. After a certain pressure is thus built up, the spring 32 yields, whereupon the piston 16 moves to the left relative to the piston 24 to generate pressure in the chamber 26 to transmit operating force to the piston 24 and to displace fluid through outlet port 52 and the associated residual pressure valve into the line 60 and thus into the front wheel cylinders 61. The mechanism thus assures initial application of the rear wheel brakes prior to initial application of the front wheel brakes, which is frequently desirable.

Assuming that no pressure can be built up in the rear wheel cylinders due, for example, to rupturing of the line 62 or leakage of the seals of the wheel cylinders 63, the operation of the rod 19 will allow the piston 24 to move relatively freely to the left. This action takes place until the left-hand end of the head 25 (FIGURE 1) engages the shoulder 49, which is arranged beyond the normal limit of movement of the piston head 25. Engagement of the head 25 with the shoulder 49 takes place with perceptible impact, which the driver will notice, thus apprising him of the fact that one set of wheel cylinders is not being operated. Beyond such point of impact, movement of the piston 24 will stop, whereupon further movement of the piston 16 will generate pressure in the chamber 26 and fluid will be displaced through port 52 into the line 60 to operate the front wheel cylinders 61. Thus the vehicle may be brought to a stop.

Assuming that no pressure can be built up in the chamber 26 incident to rupturing of the line 60 or some other fault, the operation of the rod 19 will cause the piston 16 to move freely to the left in FIGURE 1 until the bottom of the cup 30 strikes the adjacent end of the piston 24. This operation also takes place with appreciable impact to advise the driver that something is amiss. From such point on, the piston 16 will directly transmit force to the piston 24 to move it to the left in FIGURE 1. Thus pressure will be generated in the chamber 27 to apply the rear wheel brakes, as will be apparent.

In the form of the mechanism shown in FIGURE 1, it will be obvious that the spring 32 tends to maintain the two pistons at their maximum distance apart, relative movement of the two pistons away from each other being limited by the head 37. The spring 31 acts as a return spring for both pistons, this spring acting directly on the piston 16 and movement of the latter being transmitted through the cup 30 and head 37 to the piston 24 to retract such piston to the normal position shown. When the piston 24 is in normal position, engagement of the head 45 with the plate 48 slightly unseats the valve 43. It will be apparent, therefore, that if any suction exists in the chamber 27, fluid therein will be replenished around the valve 43. Fluid in the chamber 26 will be replenished in the conventional manner through the port 23.

Referring to the second form of the invention in FIGURE 4, it will be noted that all of the parts therein are in normal positions, the valve 88 being slightly unseated by engagement of the head 90 with the plate 93. Thus the hydraulic chambers 80 and 83 may be replenished with hydraulic fluid from the reservoir 11, if necessary.

The device in FIGURE 4 is operated by transmitting axial force to the piston 70 through the rod 19. The spring 96 is stronger than the spring 85, and accordingly initial movement of the piston 70 will compress the spring 85 to close the compensating port 23, whereupon fluid will be displaced from the chamber 80 through outlet port 81 and the associated residual pressure valve, and thence through line 98 to the rear wheel cylinders 99. The building-up of pressure in the chamber 80 effects movement of the piston 72. Initial movement of the piston 72 moves the plate 93 away from the head 90, whereupon the spring 95 immediately seats the valve 88. Further movement of the piston 72 generates pressure in the chamber 83 and fluid will be displaced through port 82 and the associated residual pressure valve and through line 100 to the front wheel cylinders 101. The timed relation of initial movement of the pistons 70 and 72 may be controlled in accordance with the relative loading of the springs 85 and 96.

Assuming that no pressure can be built up in the chamber 83 for reasons described above, the piston 72 will move freely under the influence of pressure in the chamber 80 until the skirt 74 engages the shoulder 75, the impact of such engagement being apparent to the driver. Further movement of the piston 70 will then apply the rear brakes through the generation of pressure in the chamber 80. Assuming that no pressure can be generated in the chamber 80, the axial extension 71 will move into engagement with the adjacent end of the piston 72, whereupon the piston 70 will transmit direct force to the piston 72, thus operating it to apply the front wheel brakes. Thus with either form of the invention, a failure in the piping system for one set of wheel brakes will still permit operation of the other set of brakes, thus eliminating a serious disadvantage in conventional systems.

It will be apparent that in both forms of the invention a differential action is afforded between the two hydraulic braking circuits, movement of the piston 24 or piston 72 depending on the amount of fluid required by the second circuit associated with the chamber 27 or 83. Accordingly, both hydraulic circuits are kept in balance.

With the mechanism shown in FIGURE 4 and with the parts operating normally, displacement from the chamber 80 may be limited to limit rear brake application by causing the axial projection 71 to engage the piston 72 when the desired maximum displacement has taken place from the chamber 80. In accordance with the design and proportion of the parts, therefore, sixty percent of the braking forces may be applied to the front wheel brakes and forty percent to the rear wheel brakes, while a different proportional output capacity can be obtained by varying the placement of the axial projection 71 and the face of the piston 72 which it engages.

The construction shown in FIGURE 1 is particularly suitable in installations where a fairly high pressure is to be applied to the rear wheel brakes before the front wheel brakes are applied. In such case the piston 24 is not directly operating against a biasing spring, as is true of operation of the piston 72 in FIGURE 4 against the spring 96. By varying the loading of the springs 85 and 96 in FIGURE 4, however, the timed relation of the application of the front and rear brakes may be varied. If the spring 96 is appreciably stronger than the spring 85, then the latter spring will be compressed prior to the spring 96 and the rear brakes will be applied first.

Fluid in the chamber 26 in FIGURE 1 and 80 in FIGURE 4 is replenished through port 23 in the conventional manner. Movement of either piston 16 or 70 to a rapid appreciable extent due to rupturing of the lines connected with the associated master cylinder chambers causes the primary cup 17 to substantially overrun the replenishing port 23 but this does not affect generation of pressure in the chamber 26. A conventional replenishing port cannot be utilized in connection with either of the chambers 27 (FIGURE 1) or 83 (FIGURE 4) since a rupturing of an associated hydraulic line would cause the piston head 25 to overrun the conventional replenishing port, thus opening the pressure chamber between the two pistons to the reservoir. It is for this reason that the replenishing valves 43 and 88 are used. Initial movement of the associated piston initially closes such a replenishing valve, and regardless of the travel of the associated piston, no loss of pressure occurs from the intermediate chamber 26 or 80.

It will be noted in both forms of the invention that an O-seal surrounds the second piston (24 in FIGURE 1 and 72 in FIGURE 4) and this seal is open to pressures in the two hydraulic chambers of the master cylinder so that it adds negligible friction to movement of the second piston in each case. It is necessary to use a cup seal on the piston 70 since atmospheric pressure is present behind this piston, but this is conventional in the usual master cylinder. If a cup seal were used around the second piston and subjected to differential pressures, substantial friction would be introduced into the device and this is eliminated in the present construction.

It also will be noted that the springs in the two forms of the invention constitute control means for determining the sequence of operation of the pistons. For example, in FIGURE 1 the spring 31 biases the piston 16 to off position while the spring 32 moves the piston 24 normally away from the piston 16 to expand the chamber 26 to its maximum capacity. Upon operation of the piston 16, force is transmited to the piston 24 through the spring 32, thus displacing fluid from the chamber 27 before there is any displacement from the chamber 26, hence one set of wheel cylinders, usually the rear wheel cylinders, will be operated before the front wheel cylinders. Upon the building-up of a predetermined pressure in the chamber 27, the piston 16 will move relative to the piston 24 to reduce the capacity of the chamber 26 to displace fluid therefrom. In the form of the invention shown in FIGURE 4, the spring 96 is stronger than the spring 85. Hence operation of the piston 70 will displace fluid first from the chamber 80 to operate the rear wheel cylinders 99, and upon the building-up of a predetermined pressure in the chamber 80, such pressure will function to move the piston 72 to displace fluid from the chamber 83. Thus, as stated, the springs in each case operate as control means to determine a highly desirable sequential operation of the pistons.

The divider 12 is preferably employed so that if the supply of fluid in the reservoir becomes low, an appreciable amount of fluid will be retained separately in the ends of the reservoir to replace fluid in the associated master cylinder fluid pressure chambers.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. A vehicle brake master cylinder construction comprising a cylinder having a pair of pistons therein normally in spaced relation to define therebetween a first hydraulic chamber having an outlet for communication with certain vehicle wheel cylinders, means projecting into one end of said cylinder and engageable with one of said pistons to move it axially toward the other piston, said other piston and the other end of said cylinder forming a second hydraulic chamber having an outlet for communication with certain other vehicle wheel cylinders, said one piston being provided with an axial recess opening into said first chamber, a stem carried by the other piston and having a head movable in said axial recess, means limiting movement of said head out of said recess to limit the spacing of said pistons, a first means biasing said pistons axially away from each other, and a second means biasing said one piston toward its normal position, whereby, upon operation of said one piston, said first biasing means will initially transmit movement to said other piston to displace fluid from said second chamber, the building-up of pressure in said second chamber resisting movement of said other piston and causing said one piston to overcome said first biasing means to reduce the capacity of said first chamber to displace fluid therefrom and to effect movement by fluid pressure of said other piston.

2. A vehicle brake master cylinder construction comprising a cylinder having a pair of pistons therein normally in spaced relation to define therebetween a first hydraulic chamber having an outlet for communication with certain vehicle wheel cylinders, means projecting into one end of said cylinder and engageable with one of said pistons to move it axially toward the other piston, said other piston and the other end of said cylinder forming a second hydraulic chamber having an outlet for communication with certain other vehicle wheel cylinders, said one piston being provided with an axial recess opening into said first chamber, a stem carried by the other piston and having a head movable in said axial recess, means limiting movement of said head out of said recess to limit the spacing of said pistons, a first means biasing said pistons axially away from each other, a second means biasing said one piston toward its normal position, whereby, upon operation of said one piston, said first biasing means will initially transmit movement to said other piston to displace fluid from said second chamber, the building-up of pressure in said second chamber resisting movement of said other piston and causing said one piston to overcome said first biasing means to reduce the capacity of said first chamber to displace fluid therefrom and to effect movement by fluid pressure of said other piston, a reservoir arranged above said cylinder and having a compensating port communicating with said first chamber adjacent said one piston, a second compensating port communicating between said second chamber and said reservoir, and means operative by said other piston for closing said second compensating port upon initial movement of said other piston from a normal off position.

3. A construction according to claim 2 wherein said second compensating port communicates axially with said second chamber, said means for closing said second compensating port comprising a valve connected to said other piston and held thereby in open position when said other piston is in said normal off position, and means for biasing said valve to closed position to be moved to such position upon initial movement of said other piston from said normal off position.

4. A vehicle brake master cylinder construction comprising a cylinder having a pair of pistons therein normally in spaced relation to define therebetween a first hydraulic chamber having an outlet for communication with certain vehicle wheel cylinders, means projecting into one end of said cylinder and engageable with one of said pistons to move it axially toward the other piston, said other piston and the other end of said cylinder forming a second hydraulic chamber having an outlet for communication with certain other vehicle wheel cylinders, said one piston being provided with an axial recess opening into said first chamber, a stem carried by the other piston and having a head movable in said axial recess, means limiting movement of said head out of said recess to limit the spacing of said pistons, a first means biasing said pistons axially away from each other, a second means biasing said one piston toward its normal position, whereby, upon operation of said one piston, said first biasing means will initially transmit movement to said other piston to displace fluid from said second chamber, the building-up of pressure in said second chamber resisting movement of said other piston and causing said one piston to overcome said first biasing means to reduce the capacity of said first chamber to displace fluid therefrom and to effect movement by fluid pressure of said other piston, a reservoir arranged above said cylinder and having a compensating port communicating with said first chamber adjacent said one piston, a second compensating port communicating between said second chamber and said reservoir, and means operative by said other piston for closing said second compensating port upon initial movement of said other piston from a normal off position, said one piston having limited movement relative to said other piston and said other piston having limited movement relative to said other end of said cylinder whereby, upon the failure of either piston to generate pressure in the chamber toward which it moves, the other piston will generate pressure in its associated chamber.

5. A vehicle brake master cylinder construction comprising a cylinder having a pair of normally spaced pistons, means projecting into one end of said cylinder and engaging one of said pistons to move it toward the other piston, said other piston having a single relatively short head forming with said one piston a first pressure chamber and forming with the other end of said cylinder a second pressure chamber, each pressure chamber having connection with certain vehicle wheel cylinders, and an O-ring seal surrounding said head and exposed to pressures in both hydraulic chambers, said seal forming the sole sealing means between said chambers, operation of said means moving said one piston to generate pressure in said first chamber and effect movement of said other piston to generate pressure in said second chamber, a reservoir above said cylinder provided with a compensating port communicating with said first pressure chamber just ahead of said one piston when the latter is in a normal position, an axial port communicating with said second pressure chamber at said other end of said cylinder and communicating with said reservoir, and means for closing said axial port upon movement of said other piston from a normal off position.

6. A vehicle brake master cylinder construction comprising a cylinder having a pair of normally spaced pistons, means projecting into one end of said cylinder and engaging one of said pistons to move it toward the other end of said cylinder, the other piston having a single relatively short head forming with said one piston a pressure chamber having an outlet for connection with certain vehicle wheel cylinders, and forming with said other end of said cylinder a second pressure chamber having an outlet for communication with certain other vehicle wheel cylinders, and an O-ring seal surrounding said head and exposed to pressures in both pressure chambers, said seal forming the sole sealing means between said chambers, operation of said means moving said one piston to generate pressure in said first chamber and effect movement of said other piston to generate pressure in said second chamber, a reservoir above said cylinder provided with a compensating port communicating with said first pressure chamber just ahead of said one piston when the latter is in a normal off position, an axial port communicating with said second chamber at said other end of said cylinder and communicating with said reservoir, a valve controlling said axial port and connected to said other piston to be held in open position when said other piston is in a normal off position, and means biasing said valve to closed position to be moved to such position upon initial movement of said other piston from said normal off position.

7. A vehicle brake master cylinder construction comprising a pair of normally spaced pistons, means projecting into one end of said cylinder and engageable with one of said pistons to move it axially toward the other piston, said other piston having a single relatively short head forming with said one piston a first pressure chamber having an outlet for communication with certain vehicle wheel cylinders, and forming with the other end of said cylinder a second pressure chamber having an outlet for communication with certain other vehicle wheel cylinders, an O-ring seal surrounding said head and exposed to pressures in both hydraulic chambers, said seal forming the sole sealing means between said chambers, a first spring arranged between said pistons to urge them away from each other, a second spring in said second chamber stronger than said first spring biasing said other piston to a normal off position, means limiting movement of said other piston to its normal off position, movement of said one piston reducing the capacity of said first chamber to displace fluid therefrom and to effect movement of said other piston to displace fluid from said second chamber, a reservoir having a compensating port communicating with said first chamber adjacent said one piston when the latter is in its normal off position, a passage communicating axially through said other end of said cylinder with said second chamber and with said reservoir and provided adjacent said second chamber with a valve seat, said means for limiting movement of said other piston to said normal off position comprising a normally open valve engageable with said seat, means for limiting movement of valve from said seat, and means for limiting movement of said other piston away from said valve.

8. A construction according to claim 7 wherein said other piston has an axial recess within said second chamber, said means for limiting movement of said other piston away from said valve comprising an axial stem carried by said valve and having a head arranged in said recess, and a stop plate carried by said other piston and normally engaging said head to hold said valve off said seat.

References Cited in the file of this patent

UNITED STATES PATENTS

| | | |
|---|---|---|
| 1,621,912 | Van Derwyk | Mar. 22, 1927 |
| 2,157,733 | Sessions | May 9, 1939 |
| 2,174,615 | Bowen et al. | Oct. 3, 1939 |
| 2,239,751 | Kritzer | Apr. 29, 1941 |
| 2,332,301 | Cox | Oct. 19, 1943 |

FOREIGN PATENTS

| | | |
|---|---|---|
| 1,048,169 | Germany | Dec. 31, 1958 |
| 716,008 | Great Britain | Sept. 22, 1954 |